United States Patent [19]

Nagai et al.

[11] Patent Number: 4,851,292

[45] Date of Patent: Jul. 25, 1989

[54] PLATE-LIKE BARIUM FERRITE PARTICLES SUITABLE FOR USE IN MAGNETIC RECORDING AND PROCESS FOR PRODUCING THE SAME

[75] Inventors: Norimichi Nagai; Akihiko Hirayama; Norio Sugita, all of Hiroshima; Masao Kiyama; Toshio Takada, both of Kyoto; Katsunori Fujimoto, Hiroshima; Yasutaka Ota, Saeki, all of Japan

[73] Assignee: Toda Kogyo Corp., Hiroshima, Japan

[21] Appl. No.: 8,439

[22] Filed: Jan. 29, 1987

[30] Foreign Application Priority Data

Jan. 29, 1986 [JP] Japan .................................. 61-18834
May 9, 1986 [JP] Japan ................................ 61-107457

[51] Int. Cl.⁴ .............................................. B32B 5/16
[52] U.S. Cl. ................... 428/403; 252/62.56; 252/62.59; 252/62.63; 428/402; 428/694
[58] Field of Search ............. 428/323, 329, 403, 694, 428/900, 402; 252/62.54, 62.56, 62.59, 62.63

[56] References Cited

U.S. PATENT DOCUMENTS

| | | | |
|---|---|---|---|
| 4,529,524 | 7/1985 | Nagai et al. ..................... | 252/62.59 |
| 4,539,129 | 9/1985 | Nagai et al. ..................... | 252/62.63 |
| 4,548,801 | 10/1985 | Nagai et al. ..................... | 252/62.63 |
| 4,561,988 | 12/1985 | Nagai et al. ..................... | 252/62.63 |
| 4,584,242 | 4/1986 | Nagai et al. ..................... | 428/403 |
| 4,585,568 | 4/1986 | Nagai et al. ..................... | 252/62.56 |
| 4,683,167 | 7/1987 | Scott et al. ..................... | 252/62.56 |
| 4,698,182 | 10/1987 | Nagai et al. ..................... | 252/62.59 |

FOREIGN PATENT DOCUMENTS

0141558 5/1985 European Pat. Off. .

Primary Examiner—Paul J. Thibodeau
Attorney, Agent, or Firm—Cushman, Darby & Cushman

[57] ABSTRACT

Disclosed herein are plate-like barium ferrite particles with a solid solution of zinc on the surface thereof, which have an average particle diameter of not less than 0.03 μm and less than 0.1 μm, a BET specific surface are of 55 to 80 m²/g, a coercive force of 300 to 1,500 Oe and a magnetization of not less than 57 emu/g, preferably not less than 60 emu/g, in magnetic field of 10 KOe, and which are represented by the following formula (I):

$$BaO \cdot n[(Fe_{1-x-y}Co_xTi_y)_2O_{3-x+y}] \quad (I)$$

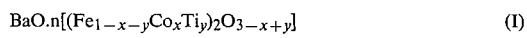

wherein x and y are independently from 0.02 to 0.12 and n is from 4 to 11, the atomic ratio of Co to Fe(III) being from 0.02:1 to 0.13:1 and the molar ratio of Ti to Co being from more than 0 to not more than 0.8, and a process for producing the plate-like barium ferrite particles.

3 Claims, 4 Drawing Sheets

PLATE-LIKE BARIUM FERRITE PARTICLES SUITABLE FOR USE IN MAGNETIC RECORDING AND PROCESS FOR PRODUCING THE SAME

BACKGROUND OF THE INVENTION

The present invention relates to plate-like barium ferrite particles suitable for use in magnetic recording, on which the surface thereof a solid solution of zinc is formed and a process for producing the same. The present invention relates, more particularly, to plate-like barium ferrite particles with a solid solution of zinc on the surface thereof, which have an average particle diameter of not less than 0.03 μm and less than 0.1 μm, a BET specific surface area of 55 to 80 m/g, a coercive force (Hc) of 300 to 1,500 Oe and a magnetization (M) of not less than 57 emu/g, preferably not less than 60 emu/g, in magnetic field of 10 KOe, and contain 2 to 13 atom % of Co with respect to Fe(III) and Ti in a molar ratio of $0 < Ti/Co \leq 0.8$, and relates to a process for producing plate-like barium ferrite particles suitable for use in magnetic recording comprising the steps of: adding 2 to 13 atom % of Co compound with respect to Fe(III) and a Ti compound in a molar ratio of $0 < Ti/Co \leq 0.8$ to an aqueous alkaline suspension of iron hydroxide (III) containing Ba ions, autoclaving the thus obtained aqueous alkaline suspension at a temperature of from 120° to 330° C., suspending the thus obtained plate-like barium ferrite particles containing Co and Ti in an aqueous solution containing zinc of pH 4.0 to 12.0 so as to deposit zinc hydroxides on the surface of the plate-like barium ferrite particles containing Co and Ti, filtering out and drying the particles, and then baking the thus obtained particles at a temperature of 600° to 900° C., to form a solid solution of zinc on the surface of the plate-like barium ferrite particles.

As described, for example, in Japanese Patent Application Laying-Open (KOKAI) No. 55-86103 (1980), ferromagnetic non-acicular particles having a large magnetization, an appropriate coercive force and an appropriate average particle size have recently been demanded as a magnetic recording material, in particular, as a perpendicular magnetic recording material.

Generally, barium ferrite particles are known as ferromagnetic non-acicular particles.

Hitherto, as a process for producing plate-like barium ferrite, a method of autoclaving an aqueous alkaline suspension containing Ba ions and Fe(III) by using an autoclave as a reaction apparatus (this method is hereinafter referred to as "autoclaving") is known.

With respect to magnetic properties, the magnetization (M) of plate-like barium ferrite particles must be as large as possible, as in described in the specification of Japanese Patent Application Laying-Open (KOKAI) No. 56-149328 (1981); ". . . the magneto plumbite ferrite which is used as a magnetic recording material is required to have the greatest possible saturation magnetization . . .".

A coercive force of about 300 to 1,500 Oe is generally required, and in order to reduce the coercive force of the produced barium ferrite particles to an appropriate coercive force in the autoclaving process, a method of substituting a part of Fe(III) in ferrite by Ti(IV) and Co(II), or Co(II) and divalent metal ions M(II) of Mn, Zn, Ni or the like has been proposed.

For example, European Patent No. 1023445 A discloses "plate-like barium ferrite particles which are represented by the formula  $BaCo_xTi_yFe_{12-x-y}O_{19}$ wherein x and y independently are numbers from 0.1 to 0.5 and which have a BET specific surface area of from 20 to 70 m²/g, an average particle diameter of from 0.05 to 0.3 μm, a magnetization of larger than 30 emu/g in a magnetic field of $7.96 \times 10^5$ A·m$^{-1}$ (10 KOe) and a coercive force of from $2.39 \times 10^4$ to $7.96 \times 10^4$ A m$^{-1}$ (300 to 1,000 Oe)", and "a process for producing plate-like barium ferrite particles represented by the formula:

$$BaCo_xTi_yFe_{12-x-y}O_{19}$$

wherein x and y independently are numbers from 0.1 to 0.5, which process comprises autoclaving at a temperature of from 250° to 320° C. an aqueous alkaline suspension containing Fe(III), Co(II), Ti(IV) and Ba ions and a molar excess with respect to the total amount of Fe(III), Co(II), Ti(IV) and Ba ions of an alkali metal hydroxide, and in which suspension the atomic ratio of the total amount of Co(II) and Ti(IV) to the amount of Fe(III) is from 0.017:1 to 0.09:1 and the atomic ratio of Ba ions to the total sum of Fe(III), Co(II) and TI(IV) is from 1:7 to 1:9".

The particle size of plate-like barium ferrite particles for use in magnetic recording is required to be as fine as possible, in particular, to be not greater than 0.3 μm.

This fact is described, for example, in Japanese Patent Application Laying-Open (KOKAI) No. 56-125219 (1981); ". . . perpendicular magnetic recording is effective in relation to horizontal recording in the region in which the recording wavelength is less than 1 μm. In order to sufficiently record and reproduce in this wavelength region, the crystalline particle diameter of the ferrite is preferably substantially less than 0.3 μm. However, if the particle diameter is about 0.01 μm, the desired coercive force is not exhibited. Therefore, a crystalline particle diameter of 0.01 to 0.3 μm is appropriate".

In order to reduce noise of a magnetic recording medium, it is necessary that the magnetic particle is as fine as possible and the BET specific surface area is large.

This fact is described in, for example, "FIG. 3" on lines 23 to 29, p 27, MR 81, *Reports of Technical Researches of the Institute of Electronics and Communication Engineers of Japan*. Namely, "FIG. 3" shows the relationship between the particle size as well as BET specific surface area and noise level of the particles in acicular maghemite particles with Co deposition. As the particle size is made smaller and the BET specific surface area increased, the noise level is linearly lowered. This relationship is the same with plate-like barium ferrite particles.

Plate-like barium ferrite particles having a large magnetization, an appropriate coercive force, an appropriate particle size and a large BET specific surface area have now been strongly demanded, but it is difficult to obtain plate-like barium ferrite particles having both large BET specific surface area and large magnetization because the magnetization of plate-like barium ferrite particles generally have a tendency to be reduced with the increase in the BET specific surface area.

The relationship between the BET specific surface area and the magnetization (M) of plate-like barium ferrite particles is obvious from "FIG. 2" and the description "FIG. 2 shows the relationship between the saturation magnetization and the specific surface area in Ba ferrite . . . larger in dimension than a single domain.

... Saturation magnetization linearly reduces with respect to the BET specific surface area" at p 199 of *the Synopses of the Lectures in 7-th Meeting of the Magnetics Society of Japan*.

Actually, although Japanese Patent Application Laying-Open (KOKAI) No. 60-66321 (1985) discloses various plate-like barium ferrite particles having a particular BET specific surface area and a particular magnetization, no plate-like barium ferrite particles which are large in both BET specific surface area and magnetization, in particular, which have both a BET specific surface area of not less than 55 m²/g and a magnetization of not less than 57 emu/g, preferably not less than 60 emu/g, have been yet obtained.

The plate-like barium ferrite particles described in *the Synopses of the Lectures in 7-th Meeting of the Magnetics Society of Japan* and Japanese Patent Application Laying-Open (KOKAI) No. 60-66321 (1985) are obtained by mixing a barium ferrite material with a glass forming material, melting the thus obtained mixture, and rapidly cooling the melt, namely by a so-called glass fusion process. A similar relationship between the BET specific surface area and the magnetization is found with plate-like barium ferrite particles produced by autoclaving.

The relationship between the BET specific surface area and the magnetization of the plate-like barium ferrite particles produced by autoclaving will be described in more detail as follows.

In autoclaving, different barium ferrite particles are precipitated depending upon the selected reaction condition. The precipitated particles have ordinarily a hexagonal plate-like configuration, and their particle size, BET specific surface area and magnetic properties are different depending upon the producing condition. It is therefore difficult to obtain plate-like barium ferrite particles having a BET specific surface area of not less than 55 m²/g while maintaining the magnetization at more than 50 emu/g.

As a method of solving this problem, a method of baking plate-like barium ferrite particles produced from an aqueous solution by autoclaving at a temperature of more than 800° C. to improve the magnetization is conventionally known [Japanese Patent Publication No. 60-12973 (1980)].

In this method, however, the magnetization tends to increase with the rise in baking temperature, and a high temperature of more than 900° C. is required in order to obtain a large magnetization, in particular, a magnetization of not less than 57 emu/g, preferably not less than 60 emu/g. In the case of baking at more than 900° C., sintering between the particles is so marked as to bulk, these formed bulk particles being unfavorable as magnetic particles for use in magnetic recording.

In order to control the coercive force (Hc) of the plate-like barium ferrite particles obtained by baking so as to be less than 1,500 Oe, a large quantity of the above-described coercive force reducing agent must be added, resulting in cause of the magnetization to be lowered. Thus, it is difficult to control the coercive force (Hc) in the range of 300 to 1,500 Oe while maintaining the magnetization at a large value, in particular, at not less than 57 emu/g, preferably not less than 60 emu/g.

In autoclaving are known a method of adding zinc in the producing reaction of plate-like barium ferrite particles [for example, Japanese Patent Publication Nos. 46-3545 (1971) and 60-12973 (1985)] and a method of coating the surfaces of plate-like barium ferrite particles with the oxide and/or the hydroxide of zinc [Japanese Patent Application Laying-Open (KOKAI) No. 58-56232 (1983)]. By any of these methods, it is difficult to obtain plate-like barium ferrite particles having a large magnetization (M) and a coercive force (Hc) of 300 to 1,500 Oe.

Thus, the offer of plate-like barium ferrite particles having a large magnetization, an appropriate coercive force and an appropriate average particle size as a magnetic material for magnetic recording, in particular, as a perpendicular magnetic recording material have been strongly demanded.

As a result of various studies on a process for producing plate-like barium ferrite particles having a large BET specific surface area, a large magnetization and an average particle size of less than 0.1 μm by autoclaving, it has been found that plate-like barium ferrite particles having a BET specific surface area of not less than 55 m²/g, a magnetization (M) of not less than 57 emu/g, preferably not less than 60 emu/g and a coercive force (Hc) of 300 to 1,500 Oe by suspending plate-like barium ferrite particles containing Co and Ti, the atomic ratio of Co to Fe(III) being from 0.02:1 to 0.13:1 and the molar ratio of Ti to Co being from more than 0 to not more than 0.8, in an aqueous solution containing zinc of pH 4.0 to 12.0 to obtain the plate-like barium ferrite particles deposited with the zinc hydroxide on the surfaces thereof, filtering out and drying the particles, and thereafter baking the particles at a temperature of 600° to 900° C. to form a solid solution of zinc on the surfaces of the plate-like barium ferrite particles, and based on the finding the present invention has been attained.

SUMMARY OF THE INVENTION

In a first aspect of the present invention, there is provided plate-like barium ferrite particles with a solid solution of zinc on the surface thereof, which have an average particle diameter of not less than 0.03 μm and less than 0.1 μm, a BET specific surface area of 55 to 80 m²/g, a coercive force of 300 to 1,500 Oe and a magnetization of not less than 57 emu/g in magnetic field of 10 KOe, and which are represented by the following formula (I):

$$BaO \cdot n[(Fe_{1-x-y}Co_xTi_y)_2O_{3-x+y}] \quad (I)$$

wherein x and y are independently from 0.02 to 0.12 and n is from 4 to 11, the atomic ratio of Co to Fe(III) being from 0.02:1 to 0.13:1 and the molar ratio of Ti to Co being from more than 0 to not more than 0.8.

In a second aspect of the present invention, there is provided a process for producing plate-like barium ferrite particles with a solid solution of zinc on the surface thereof, which are represented by the following formula (I):

$$BaO \cdot n[(Fe_{1-x-y}Co_xTi_y)_2O_{3-x+y}] \quad (I)$$

wherein x and y are independently from 0.02 to 0.12 and n is from 4 to 11, the atomic ratio of Co to Fe(III) being from 0.02:1 to 0.13:1 and the molar ratio of Ti to Co being from more than 0 to not more than 0.8, which comprises autoclaving at a temperature of from 120° to 330° C. an aqueous alkaline suspension of iron hydroxide containing Co(II), Ti(IV) and Ba ions and a molar excess with respect to the total amount of Fe(III), Co(II), Ti(IV) and Ba ions of an alkali metal hydroxide, in said suspension the atomic ratio of the amount to Co to the amount of Fe(III) being from 0.02:1 to 0.13:1 and the molar ratio of Ti to Co being from more than 0 to not more than 0.8, suspending the thus obtained plate-like barium ferrite particles containing Co and Ti in an aqueous solution containing zinc of pH 4.0 to 12.0 to deposit the zinc hydroxide on the surface of said plate-like Ba particles containing Co and Ti, filtering out and drying the plate-like barium ferrite particles containing Co and Ti deposited with the hydroxide of zinc on the surfaces thereof, and baking the particles obtained at a temperature of 600° to 900° C., thereby form a solid solution of zinc on the surface of said plate-like barium ferrite particles.

DESCRIPTION OF THE PREFERRED EMBODIMENTS

Plate-like barium ferrite particles suitable for use in magnetic recording according to the present invention, which have an average particle diameter of not less than 0.03 μm and less than 0.1 μm, a BET specific surface area of 55 to 80 m²/g, a coercive force of 300 to 1,500 Oe and a magnetization of not less than 57 emu/g, preferably not less than 60 emu/g, in a magnetic field of 10 KOe, and which are represented by the following formula (I):

$$BaO \cdot n[(Fe_{1-x-y}Co_xTi_y)_2O_{3-x+y}] \quad (I)$$

wherein x and y are independently from 0.02 to 0.12 and n is from 4 to 11, the atomic ratio of Co to Fe(III) being from 0.02:1 to 0.13:1 and the molar ratio of Ti to Co being from more than 0 to not more than 0.8, and on which the surface thereof a solid solution of zinc is formed, are obtained by the following process.

The plate-like barium ferrite particles containing Co and Ti are first produced by adding 2 to 13 atom % of Co compound with respect to Fe(III) and a Ti compound in a molar ratio of $0<Ti/Co\leq 0.8$ to an aqueous alkaline suspension of iron hydroxide (III) containing Ba ions, and autoclaving the thus obtained aqueous alkaline suspension of iron hydroxide (III) at a temperature ranging from 120° to 330° C. The thus obtained plate-like barium ferrite particles containing Co and Ti is suspended in an aqueous solution containing zinc of pH 4.0 to 12.0 to deposit the zinc hydroxide on the surface of the plate-like barium ferrite particles containing Co and Ti, and after filtering out and drying, the thus obtained plate-like barium ferrite particles are baked at a temperature of 600° to 900° C.

Namely, the heart of the present invention is characterized in that plate-like barium ferrite particles having an average particle diameter of less than 0.1 μm can be produced by adding 2 to 13 atom % of Co compound with respect to Fe(III) and a Ti compound in a molar ratio of $0<Ti/Co\leq 0.8$ to an aqueous alkaline suspension of iron hydroxide (III), and autoclaving the aqueous alkaline suspension of iron hydroxide (III) at a temperature of 120° to 330° C.; the plate-like barium ferrite particles containing Co and Ti are suspended in an aqueous solution containing zinc of pH 4.0 to 12.0, thereby obtaining plate-like barium ferrite particles containing Co and Ti, on which the surface thereof the zinc hydroxide is deposited; and after filtering out and drying, the thus obtained plate-like barium ferrite particles containing Co and Ti are baked at a temperature of 600° to 900° C. to form a solid solution of zinc on the surface thereof, thereby enabling the magnetization of the plate-like barium ferrite particles containing Co and Ti to effectively increase at a baking temperature below 900° C. while retaining a large BET specific surface area, e.g., a BET specific surface area of not less than 55 m²/g, and as a result the production of plate-like barium ferrite particles containing Co and Ti having a BET specific surface area of not less than 55 m²/g and a magnetization of not less than 57 emu/g, preferably not less than 60 emu/g.

The present invention will be explained in more detail in the following with reference to some of the experiments carried out by the present inventors.

Figure 1:
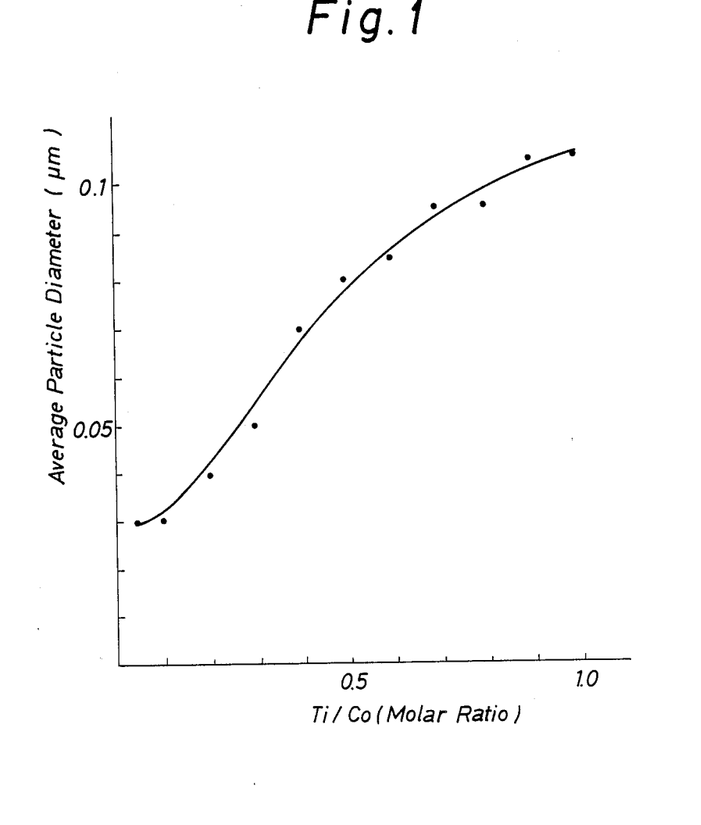
FIGS. 1 and 2 show the relationship between the ratio of addition of Ti to Co (in a molar ratio) in the case of adding 7.86 atom % of Co with respect to Fe(III) and the particle size as well as the BET specific surface area, respectively, of the produced plate-like barium ferrite particles.
Figure 2:
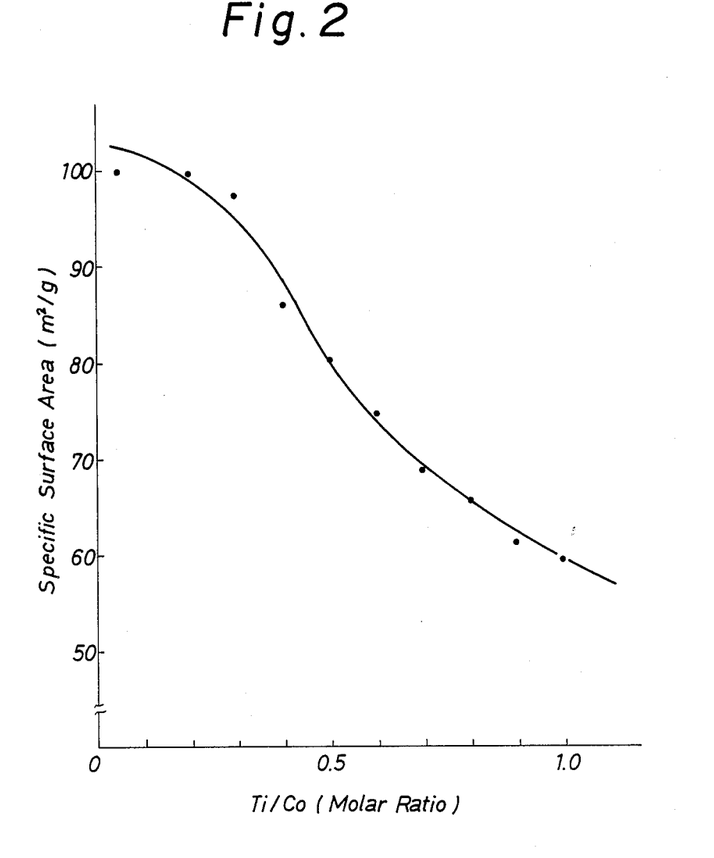

FIGS. 1 and 2 show the relationship between the ratio of addition (in a molar ratio) of Ti with respect to Co in the case of adding 7.86 atom % of Co to Fe (III), and the particle size and the BET specific surface area, respectively, of the produced plate-like barium ferrite particles.

As is obvious from FIGS. 1 and 2, when Ti is added to Co in a ratio of not greater than 0.8, the particle diameter of the produced plate-like barium ferrite particles is less than 0.1 μm and the BET specific surface area is not less than 65 m²/g in the case of non-baking, and when the ratio of addition of Ti to Co is smaller, the produced plate-like barium ferrite particles become finer.

A method of adding a Co compound and a Ti compound when producing plate-like barium ferrite particles by autoclaving is conventionally known, as is disclosed in, e.g., Japanese Patent Application Laying-Open (KOKAI) No. 56-149328(1981).

The purpose of this method, however, is to reduce a coercive force by adjusting the valence of Fe(III) ions and additives, and therefore it is preferable that the amounts of Co(II) compound and Ti(IV) compound to be added are equimolar. On the other hand, in the present invention, the amounts of Co(II) compound and Ti(IV) compound to be added are different and they are added in order to control the particle size and the BET specific surface area of produced plate-like barium ferrite particles. Accordingly, the process of the present invention is completely different from the conventional process in technical means, objects and effects.

In the present invention, since it is possible to reduce the amount of a coercive force reducing agent to be added, which will cause the magnetization to be lowered on the basis of the finding that it is possible to effectively increase the magnetization and to lower the coercive force of plate-like barium ferrite particles by forming a solid solution of zinc on the surfaces of the plate-like barium ferrite particles, it is possible to effectively control the coercive force in the range of 300 to 1,500 Oe while retaining a large magnetization.

The reason why it is possible to effectively increase the magnetization while holding the particle size and a large BET specific surface area and to control the coercive force while maintaining a large magnetization is considered to be that a solid solution of zinc is formed on the surfaces of the plate-like barium ferrite particles, in consideration of the fact that the effects of the present invention cannot be obtained by either a method of adding zinc during production reaction of plate-like barium ferrite particles in autoclaving or a method of coating the surfaces of plate-like barium ferrite particles with the oxide and/or the hydroxide of zinc, as is shown in Comparative Examples.

In the present invention, in the case where the amount of solid solution of zinc on the surfaces of plate-like barium ferrite particles increases, the magnetization effectively increases and the coercive force reduces.

The amount of a solid solution of zinc on the surfaces of plate-like barium ferrite particles is controlled by adjusting the pH of the solution at the time of depositing the zinc hydroxide on the surface of the particles and the amount of zinc to be added.

The amount of deposition of the zinc hydroxide on the surfaces of the particles has a tendency of increasing with the increase in pH, and preferable pH is in the range of 4 to 12 and more preferable pH is in the range of 8 to 10.

As the Fe(III) salt in the present invention, iron nitride, iron chloride, or the like may be used.

As the Ba ions in the present invention, barium hydroxide, barium chloride, barium nitride or the like may be used.

The reaction temperature in autoclaving in the present invention is 120° to 330° C.

If it is below 120° C., it is difficult to produce plate-like barrium ferrite particles.

Although it is possible to produce plate-like barium ferrite particles even if it exceeds 330° C., the upper limit is determined to be 330° C. in consideration of the safety of the apparatus.

As the Co compound in the present invention, cobalt chloride, cobalt nitride or the like may be used.

The amount of the Co compound to be added is 2 to 13 atom % with respect to Fe(III).

If it is less than 2 atom %, it is difficult to produce plate-like barium ferrite particles having a particle diameter of less than 0.1 μm and a BET specific surface area of not less than 65 m²/g in the case of non-baking.

Although it is possible to produce plate-like barium ferrite particles having a particle diameter of less than 0.1 μm and a BET specific surface area of not less than 65 m²/g in the case of non-baking even if it exceeds 13 atom %, there is no use in adding more Co compound than required.

The Ti compound used in the present invention includes titanium chloride, titanium oxysulfide and alkali titanium.

The amount of Ti compound to be added is in the range of $0 < Ti/Co \leq 0.8$ in a molar ratio.

In the range of $0 < Ti/Co \leq 0.8$, as the amount of Ti to be added becomes smaller, the particle size of the produced plate-like barium ferrite particles becomes smaller and the specific surface area becomes larger. By adjusting the amount of Ti to be added, it is therefore possible to control the particle size and the BET specific surface area so as to have the desired value in the range of a particle diameter of not less than 0.03 μm and less than 0.1 μm and a BET specific surface area of 65 to 150 m²/g in the case of non-baking.

The entire amount of Co compound and Ti compound to be added is contained in plate-like barium ferrite particles, and accordingly the plate-like barium ferrite particles obtained contains 2 to 13 atom %, preferably 4.0 to 10.0 atom % with respect to Fe, and Ti in the range of $0 < Ti/Co \leq 0.8$, preferably $0.1 \leq Ti/Co \leq 0.7$ in a molar ratio.

The plate-like barium ferrite particles obtained in this way are represented by the formula:

$$BaO \cdot n[(Fe_{1-x-y}Co_xTi_y)_2O_{3-x+y}]$$

wherein n is 4 to 11, x and y are independently 0.02 to 0.12, Co/Fe (atom %) being 2 to 13, preferably 4.0 to 10, and Ti/Co (molar ratio) being more than 0 and not more than 0.8, preferably 0.1 to 0.7.

The zinc hydroxide in the present invention is deposited by suspending plate-like barium ferrite particles in an aqueous solution containing zinc of pH 4.0 to 12.0, preferably pH 8 to 10.

As the zinc compound of the present invention, a halide such as zinc chloride, zinc bromide and zinc iodide; zinc nitride; zinc sulfide; zinc acetate or the like may be used.

If the pH is less than 4 or more than 12, deposition of zinc is difficult.

The baking temperature in the present invention is 600° to 900° C., preferably 700° to 850° C.

If it is below 600° C., a solid solution of zinc on the surfaces of plate-like barium ferrite particles is insufficient.

If it is above 900° C., since sintering between the particles is too remarkable, it is difficult to obtain plate-like barium ferrite particles having a BET specific surface area of more than 55 m²/g.

The plate-like barium ferrite particles according to the present invention after baking have a BET specific surface area of 55 to 80 m²/g, a coercive force (Hc) of 300 to 1,500 Oe and a magnetization (M) of not less than 57 emu/g, preferably not less than 60 emu/g, in magnetic field of 10 KOe.

If the BET specific surface area is less than 55 m²/g, it is difficult to reduce noise in a magnetic recording medium, and if it is more than 80 m²/g, dispersion of the particles in a vehicle is difficult.

In consideration of reduction of noise in a magnetic recording medium and dispersibility in a vehicle, the BET specific surface area is preferably 60 to 75 m²/g.

The surfaces of the plate-like barium ferrite particles may be coated with a compound showing an anti-sintering effect such as an Si compound, Al compound and P compound before baking.

The amount of a solid solution of zinc with respect to plate-like barium ferrite particles of the present invention is 0.2 to 5.0 wt %, preferably 0.7 to 4.5 wt %.

If it is less than 0.2 wt %, it is impossible to sufficiently achieve the object of the present invention.

Although it is possible to achieve the object of the present invention even if it is more than 5.0 wt %, there is no use in adding a larger amount of zinc than necessary.

Since the plate-like barium ferrite particles with a solid solution of zinc on the surface thereof according to the present invention, represented by the formula:

$BaO \cdot n[(Fe_{1-x-y}Co_xTi_y)_2O_{3-x+y}]$ wherein n is 4 to 11, x and y are independently 0.02 to 0.12, Co/Fe (atom %) being 2 to 13 and Ti/Co (molar ratio) being more than 0 and not more than 0.8, have an average particle diameter of not less than 0.03 μm and less than 0.1 μm, a BET specific surface area of 55 to 80 m²/g, preferably 60 to 75 m²/g, a magnetization (M) of not lower than 57 emu/g, preferably not less than 60 emu/g, in magnetic field of 10 KOe, and a coercive force (Hc) of 300 to 1,500 Oe, preferably 400 to 1,300 Oe, they are suitable as a magnetic material for magnetic recording, especially, as a perpendicular magnetic recording material.

The present invention will now be explained with reference to the following examples and comparative examples.

The average particle diameter and the specific surface area in each of the examples and comparative examples are represented by the values measured from an electron microphotograph and a BET method, respectively.

The magnetization (M) and the coercive force (Hc) of the particles were measured in the form of powders in magnetic field of 10 KOe.

PRODUCTION OF PLATE-LIKE BARIUM FERRITE PARTICLES FROM AQUEOUS SOLUTION

EXAMPLE 1

An aqueous alkaline suspension of 14 mol of Fe(NO₃)₃, 1.2 mol (equivalent to 8.57 atom % with respect to Fe(III)) of Co(NO₃)₂, 0.2 mol (equivalent to Ti/Co=0.167 in a molar ratio) of TiCl₄, 1.40 mol of Ba(OH)₂·8H₂O and 164 mol of NaOH was charged into an autoclave, heated to 280° C. and held at this temperature for 5 hours while being mechanically stirred, to generate brown ferromagnetic precipitates.

After the suspension was cooled to room temperature, the brown ferromagnetic precipitates were filtered out, washed adequately, and dried.

Figure 3:
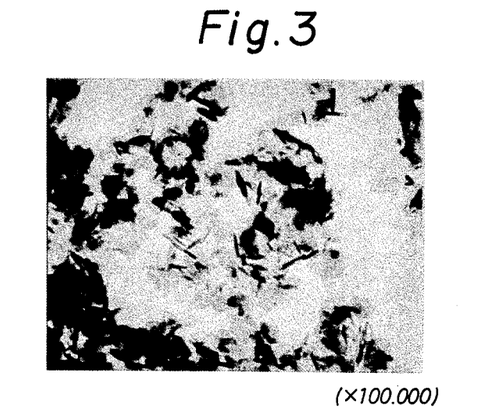
FIG. 3 is electron microphotograph ($\times 100,000$) of the particle structures of the plate-like barium ferrite particles produced from an aqueous solution in Example 1.

The brown ferromagnetic particles were proved by X-ray fluorescence analysis and X-ray diffraction to be barium ferrite particles containing 8.6 atom % of Co with respect to Fe(III) and Ti of Ti/Co=0.17 in a molar ratio. As is clear from the electron microphotograph (×100,000) in FIG. 3, they were plate-like particles having an average particle diameter of 0.04 μm and a specific surface area of 90.7 m²/g.

EXAMPLES 2 to 8, COMPARATIVE EXAMPLE 1

Various plate-like barium ferrite particles were produced by the same process as that in Example 1 by varying the kinds of ferric salt aqueous solutions and Ba salt aqueous solutions, the kinds and quantities of Co compounds and Ti compounds, and reaction temperature and time.

The main producing conditions and various properties of the products are shown in Table 1.

COMPARATIVE EXAMPLE 2

Brown ferromagnetic precipitates were generated in the same way as in Example 2 except that 0.98 mol of zinc chloride, as well as Co and Ti, was added in autoclaving. The precipitates were filtered out, adequately washed and dried.

The brown ferromagnetic particles were proved by X-ray fluorescence analysis and X-ray diffraction to be barium ferrite particles containing 8.6 atom % of Co with respect to Fe(III) and Ti of Ti/Co=0.33 in a molar ratio. As a result of the observation of an electron microphotograph, they were proved to be plate-like particles having an average particle diameter of 0.10 μm and a specific surface area of 68.2 m²/g.

PRODUCTION OF PLATE-LIKE Ba FERRITE PARTICLES WITH A SOLID SOLUTION OF ZINC BY HEAT TREATMENT

EXAMPLE 9

The brown ferromagnetic particles obtained in Example 1 were used as the starting material. 100 g of the starting material was dispersed and mixed in an aqueous solution containing 0.07 mol of zinc chloride, and after the zinc hydroxide was deposited on the surfaces of the particles when the pH of the solution was 6.0, the particles were filtered out, dried and then baked at 800° C. for 2.0 hours.

Figure 4:
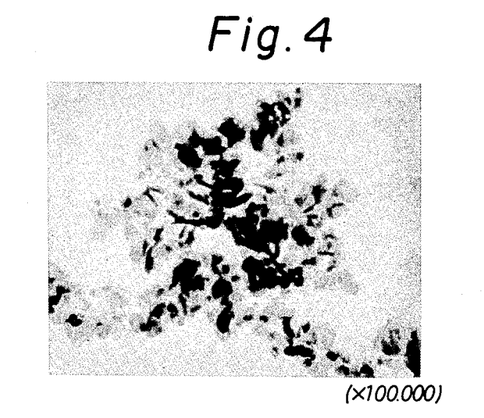
FIG. 4 is electron microphotograph ($\times 100,000$) of the particle structures of the plate-like barium ferrite particles obtained by baking in Example 9.

The particles obtained by baking had an average particle diameter of 0.04 μm and a BET specific surface area of 74.8 m²/g, as is clear from the electron microphotograph (×100,000) in FIG. 4. With respect to the magnetic properties, a coercive force (Hc) was 710 Oe and a magnetization (M) was 63.9 emu/g.

As a result of X-ray fluorescence analysis, it was found that the particles contained 8.6 atom % of Co with respect to Fe, Ti of Ti/Co=0.17 in a molar ratio, and 2.8 wt % of Zn.

Figure 5:
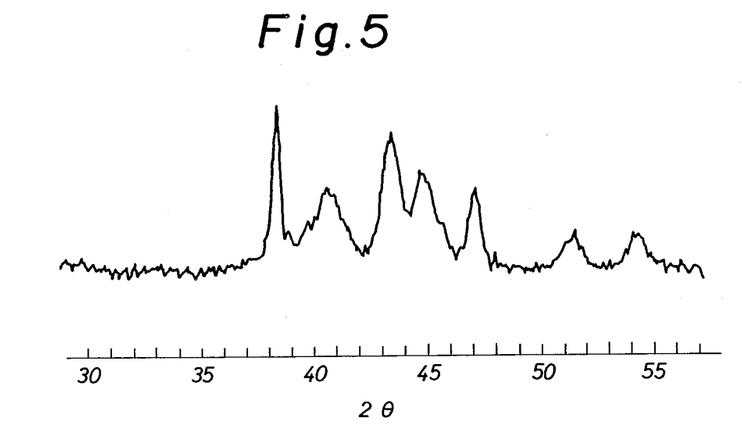
FIG. 5 shows an X-ray diffraction pattern of the plate-like barium ferrite particles with a solid solution of zinc, obtained in Example 9.

When the plate-like barium ferrite particles were diffracted by an X-ray, only the peaks that represent a magneto plumbite structure were observed, as is clear from FIG. 5, and as a result of chemical analysis of the particles, no zinc oxide or zinc hydroxide was detected which is to be extracted with heating from an alkaline solution. From these facts it was confirmed that a solid solution Zn has been formed on the surface of the particles. According to X-ray fluorescence analysis, the composition of the thus obtained plate-like barium ferrite particles with a solid solution of zinc is represented by $BaO \cdot 8.5[(Fe_{0.909}Co_{0.078}Ti_{0.013})_2O_{2.94}]$.

EXAMPLES 10 to 20

Various plate-like barium ferrite particles were produced by the same process as that in Example 9 by varying the kinds of the starting material, and the kinds and quantities of Zn to be added, and heating temperature and time.

As a result of X-ray diffraction and chemical analysis, it was confirmed that a solid solution of zinc was formed on the surface of the plate-like barium ferrite particles obtained in Examples 10 to 20.

COMPARATIVE EXAMPLE 3

Plate-like barium ferrite particles with a solid solution of zinc on the surface thereof were obtained by the same process as that in Example 9 except using the plate-like barium ferrite particles obtained in Comparative Example 1 as the starting material.

The thus obtained particles by baking had an average particle diameter of 0.15 μm and a BET specific surface area of 39.3 m²/g. With respect to the magnetic properties, a coercive force (Hc) was 1,290 Oe and a magnetization (M) was 59.1 emu/g.

As a result of X-ray fluorescence analysis, it was found that the particles contained 1.4 atom % of Co with respect to Fe and 0.5 atom % of Ti with respect to Co, and an amount of a solid solution of zinc thereof was 2.8 wt %.

COMPARATIVE EXAMPLE 4

Plate-like barium ferrite particles were obtained by the same process as that in Example 13 except using the plate-like barium ferrite particles obtained in Comparative Example 2 as the starting material and depositing no zinc hydroxide.

The thus obtained particles by baking had an average particle diameter of 0.10 μm and a BET specific surface area of 47.0 m$^2$/g. With respect to the magnetic properties, a coercive force (Hc) was 1,180 Oe and a magnetization (M) was 53.2 emu/g.

As a result of X-ray fluorescence analysis, it was found that the particles contained 8.6 atom % of Co with respect to Fe, 0.33 atom % of Ti with respect to Co, and 4.4 wt % of zinc.

COMPARATIVE EXAMPLE 5

Plate-like barium ferrite particles were obtained by the same process as that in Example 13 except that no zinc hydroxide was deposited on the plate-like barium ferrite particles containing Co and Ti and the baking temperature was 920° C.

The thus obtained particles by baking had an average particle diameter of 0.18 μm and a BET specific surface area of 18.0 m$^2$/g. With respect to the magnetic properties, a coercive force (Hc) was 1,086 Oe and a magnetization (M) was 57.0 emu/g.

As a result of X-ray fluorescence analysis, it was found that the particles contained 8.6 atom % of Co with respect to Fe and 0.33 atom % of Ti with respect to Co.

COMPARATIVE EXAMPLE 6

Plate-like barium ferrite particles were obtained by the same process as that in Example 13 except that no zinc hydroxide was deposited on the plate-like barium ferrite particle.

Zinc hydroxide was deposited on the plate-like barium ferrite particles in the same way as in Example 13. The thus obtained plate-like barium ferrite particles were filtered out, dried and baked at a temperature of 150° C. for 5 hours.

The thus obtained particles had an average particle diameter of 0.08 μm and a BET specific surface area of 61.1 m$^2$/g. With respect to the magnetic properties, a coercive force (Hc) was 1,200 Oe and a magnetization (M) was 52.4 emu/g.

As a result of chemical analysis of the particles obtained in Comparative Example 6, the oxide and the hydroxide of zinc were detected which are to be extracted with heating from an alkaline solution. From this fact it was confirmed that zinc existed on the surfaces of the particles in the form of the oxide and the hydroxide of zinc and that a solid solution of zinc was not formed.

As a result of X-ray fluorescence analysis, it was found that the particles contained 2.5 wt % of zinc.

COMPARATIVE EXAMPLE 7

Plate-like barium ferrite particles were obtained by the same process as that in Example 13 except that no zinc hydroxide was deposited on the plate-like barium ferrite particle.

Zinc hydroxide was deposited on the plate-like barium ferrite particles in the same way as in Example 13. The thus obtained plate-like barium ferrite particles were filtered out, dried and baked at a temperature of 150° C. for 5 hours.

The thus obtained particles had an average particle diameter of 0.08 μm and a BET specific surface area of 61.7 m$^2$/g. With respect to the magnetic properties, a coercive force (Hc) was 1,190 Oe and a magnetization (M) was 53.0 emu/g.

As a result of chemical analysis of the particles obtained in Comparative Example 7, the oxide and the hydroxide of zinc were detected which are to be extracted with heating from an alkaline solution. From this fact it was confirmed that zinc existed on the surfaces of the particles in the form of the oxide and the hydroxide of zinc and that a solid solution of zinc was not formed.

As a result of X-ray fluorescence analysis, it was found that the particles contained 2.5 wt % of zinc.

REFERENCE EXAMPLES 1 to 9

The plate-like barium ferrite particles were obtained in the same way as in Examples 9, 13 to 20 except that no zinc hydroxide was deposited. The properties of the particles obtained are shown in Table 3.

TABLE 1

| | Production of Plate-like Barium Ferrite Particles from Aqueous Solution | | | | | | | | | | | | Produced Plate-like Barium Ferrite Particles | |
|---|---|---|---|---|---|---|---|---|---|---|---|---|---|---|
| | Ferric Salt Aqueous Solution | | Ba Salt Aqueous Solution | | Co compound | | | Ti compound | | | | | | |
| Example No. and Comparative Example No. | Kind | Quantity (mol) | Kind | Quantity (mol) | Kind | Quantity (mol) | Co/Fe (atom %) | Kind | Quantity (mol) | Ti/Co (molar ratio) | Temperature (°C.) | Time (hour) | Particle Diameter (μm) | Specific Surface Area (m²/g) |
| Example 1 | Fe(NO₃)₃ | 14 | Ba(OH)₂·8H₂O | 1.40 | Co(NO₃)₂ | 1.2 | 8.57 | TiCl₄ | 0.2 | 0.167 | 280 | 5 | 0.04 | 90.7 |
| Example 2 | FeCl₃ | " | BaCl₂·2H₂O | 1.33 | " | 1.2 | 8.57 | " | 0.4 | 0.334 | 300 | 3 | 0.08 | 75.0 |
| Example 3 | FeCl₃ | " | BaCl₂·2H₂O | 1.33 | CoCl₂ | 1.1 | 7.86 | " | 0.4 | 0.364 | 200 | 3 | 0.06 | 94.5 |
| Example 4 | " | " | " | " | " | 1.0 | 7.14 | " | 0.6 | 0.600 | 200 | " | 0.08 | 82.4 |
| Example 5 | Fe(NO₃)₃ | " | Ba(OH)₂·8H₂O | 1.4 | Co(NO₃)₂ | 1.2 | 8.57 | " | 0.6 | 0.500 | 250 | 5 | 0.08 | 74.9 |
| Example 6 | " | " | " | " | CoCl₂ | 0.9 | 6.43 | " | 0.4 | 0.444 | 200 | " | 0.06 | 87 |
| Example 7 | " | " | BaCl₂·2H₂O | 1.56 | " | 1.4 | 10.0 | " | 0.2 | 0.143 | 180 | " | 0.04 | 101.3 |
| Example 8 | FeCl₃ | " | " | 1.4 | Co(NO₃)₂ | 0.6 | 4.29 | TiOSO₄ | 0.4 | 0.667 | 250 | " | 0.09 | 65.9 |
| Comparative Example 1 | Fe(NO₃)₃ | 14 | Ba(OH)₂·8H₂O | 1.4 | Co(NO₃)₂ | 0.2 | 1.43 | TiCl₄ | 0.1 | 0.5 | 280 | 5 | 0.15 | 50.1 |

TABLE 2

| Example No. | Kind of Starting Material (Example No.) | Addition of Zn Kind | Quantity (mol/ 100 g) | Heat treatment Temperature (°C.) | Heat treatment Time (hour) | Co/Fe Content (atom %) | Ti/Co Content (molar ratio) | Zn Content (wt %) | Formula | Average Particle Diameter (μm) | Specific Surface Area (m²/g) | Magnetization (M) (emu/g) | Coercive Force (Hc) (Oe) |
|---|---|---|---|---|---|---|---|---|---|---|---|---|---|
| Example 9 | Example 1 | ZnCl$_2$ | 0.07 | 800 | 2.0 | 8.6 | 0.17 | 2.8 | BaO.8.5[(Fe$_{0.909}$Co$_{0.078}$Ti$_{0.013}$)$_2$O$_{2.94}$] | 0.04 | 74.8 | 63.9 | 710 |
| Example 10 | Example 1 | " | 0.04 | " | " | " | " | 1.8 | BaO.7.2[(Fe$_{0.911}$Co$_{0.077}$Ti$_{0.012}$)$_2$O$_{2.94}$] | " | 74.1 | 60.7 | 830 |
| Example 11 | Example 1 | Zn(NO$_3$)$_2$ | 0.07 | " | " | " | " | 2.9 | BaO.8.5[(Fe$_{0.910}$Co$_{0.077}$Ti$_{0.013}$)$_2$O$_{2.94}$] | " | 73.3 | 64.0 | 650 |
| Example 12 | Example 1 | " | " | 850 | 3.0 | " | " | " | BaO.8.5[(Fe$_{0.910}$Co$_{0.077}$Ti$_{0.013}$)$_2$O$_{2.94}$] | " | 68.7 | 64.7 | 550 |
| Example 13 | Example 2 | ZnCl$_2$ | 0.07 | 800 | 1.5 | 8.6 | 0.33 | 2.5 | BaO.9.0[(Fe$_{0.897}$Co$_{0.077}$Ti$_{0.026}$)$_2$O$_{2.95}$] | 0.08 | 60.5 | 61.2 | 680 |
| Example 14 | Example 3 | Zn(NO$_3$)$_2$ | 0.04 | 880 | 3.0 | 7.9 | 0.36 | 1.9 | BaO.7.5[(Fe$_{0.903}$Co$_{0.071}$Ti$_{0.026}$)$_2$O$_{2.96}$] | 0.06 | 65.5 | 61.4 | 703 |
| Example 15 | Example 4 | ZnSO$_4$ | 0.05 | 830 | 1.5 | 7.1 | 0.60 | 2.3 | BaO.7.7[(Fe$_{0.898}$Co$_{0.064}$Ti$_{0.038}$)$_2$O$_{2.97}$] | 0.08 | 60.0 | 62.3 | 6 |
| Example 16 | Example 5 | ZnCl$_2$ | 0.08 | 650 | 2.0 | 8.6 | 0.50 | 3.2 | BaO.8.8[(Fe$_{0.886}$Co$_{0.076}$Ti$_{0.038}$)$_2$O$_{2.96}$] | " | 64.9 | 60.8 | 755 |
| Example 17 | Example 6 | ZnSO$_4$ | 0.02 | 830 | 1.5 | 6.4 | 0.44 | 0.8 | BaO.6.2[(Fe$_{0.915}$Co$_{0.059}$Ti$_{0.026}$)$_2$O$_{2.97}$] | 0.06 | 65.5 | 62.0 | 930 |
| Example 18 | Example 7 | " | 0.10 | 700 | 3.0 | 10.0 | 0.14 | 4.0 | BaO.8.7[(Fe$_{0.897}$Co$_{0.090}$Ti$_{0.013}$)$_2$O$_{2.92}$] | 0.04 | 79.8 | 63.1 | 430 |
| Example 19 | Example 8 | ZnCl$_2$ | 0.07 | 830 | 1.5 | 4.3 | 0.67 | 2.8 | BaO.8.5[(Fe$_{0.933}$Co$_{0.039}$Ti$_{0.027}$)$_2$O$_{2.99}$] | 0.09 | 55.2 | 65.0 | 995 |
| Example 20 | Example 8 | " | 0.03 | 800 | " | 4.3 | 0.67 | 1.1 | BaO.6.7[(Fe$_{0.933}$Co$_{0.039}$Ti$_{0.028}$)$_2$O$_{2.99}$] | 0.09 | 57.1 | 62.2 | 1250 |

TABLE 3

| Reference Example No. | Kind of Starting Material (Example No.) | Heat Treatment Temperature (°C.) | Heat Treatment Time (hour) | Produced Plate-like Barium Ferrite Particles Average Particle Diameter (μm) | Specific Surface Area (m²/g) | Magnetization (M) (emu/g) | Coercive Force (Hc) (Oe) |
|---|---|---|---|---|---|---|---|
| Reference Example 1 | Example 1 | 800 | 2.0 | 0.04 | 75.2 | 55.3 | 1097 |
| Reference Example 2 | Example 1 | 850 | 3.0 | " | 68.0 | 55.2 | 1010 |
| Reference Example 3 | Example 2 | 800 | 1.5 | 0.08 | 60.0 | 54.4 | 1210 |
| Reference Example 4 | Example 3 | 880 | 3.0 | 0.06 | 64.8 | 55.0 | 1130 |
| Reference Example 5 | Example 4 | 830 | 1.5 | 0.08 | 59.1 | 54.2 | 1250 |
| Reference Example 6 | Example 5 | 650 | 2.0 | " | 64.7 | 51.1 | 980 |
| Reference Example 7 | Example 6 | 830 | 1.5 | 0.06 | 65.1 | 54.8 | 1420 |
| Reference Example 8 | Example 7 | 700 | 3.0 | 0.04 | 80.5 | 52.7 | 1250 |
| Reference Example 9 | Example 8 | 830 | 1.5 | 0.09 | 53.9 | 54.6 | 1730 |

What is claimed is:

1. Plate-like barium ferrite particles with a solid solution of zinc on the surface thereof, which have an average particle diameter of not less than 0.03 μm and less than 0.1 μm, 0.2 to 5.0 wt % of the solid solution of zinc with respect to the plate-like barium ferrite particles with the solid solution of zinc on the surface thereof, a BET specific surface area of 55 to 80 m²/g, a coercive force of 300 to 1,500 Oe and a magnetization of not less than 57 emu/g in magnetic field of 10 KOe, and which are represented by the following formula (I):

$$BaO \cdot n[(Fe_{1-x-y}Co_xTi_y)_2O_{3-x+y}] \quad (I)$$

wherein x and y are independently from 0.02 and 0.12 and n is from 4 to 11, the atomic ratio of Co to Fe (III) being from 0.02:1 to 0.13:1 and the molar ratio of Ti to Co being from more than 0 to not more than 0.8.

2. Plate-like barium ferrite particles according to claim 1, wherein the atomic ratio of Co to Fe(III) is 0.04:1 to 0.10:1 and the molar ratio of Ti to Co is 0.1 to 0.7.

3. Plate-like barium ferrite particles according to claim 1, wherein a magnetization is not less than 60 emu/g.

* * * * *